Sept. 25, 1951     W. R. TALIAFERRO     2,569,353
CONTROL SYSTEM FOR CIRCUIT BREAKERS
Filed July 22, 1948
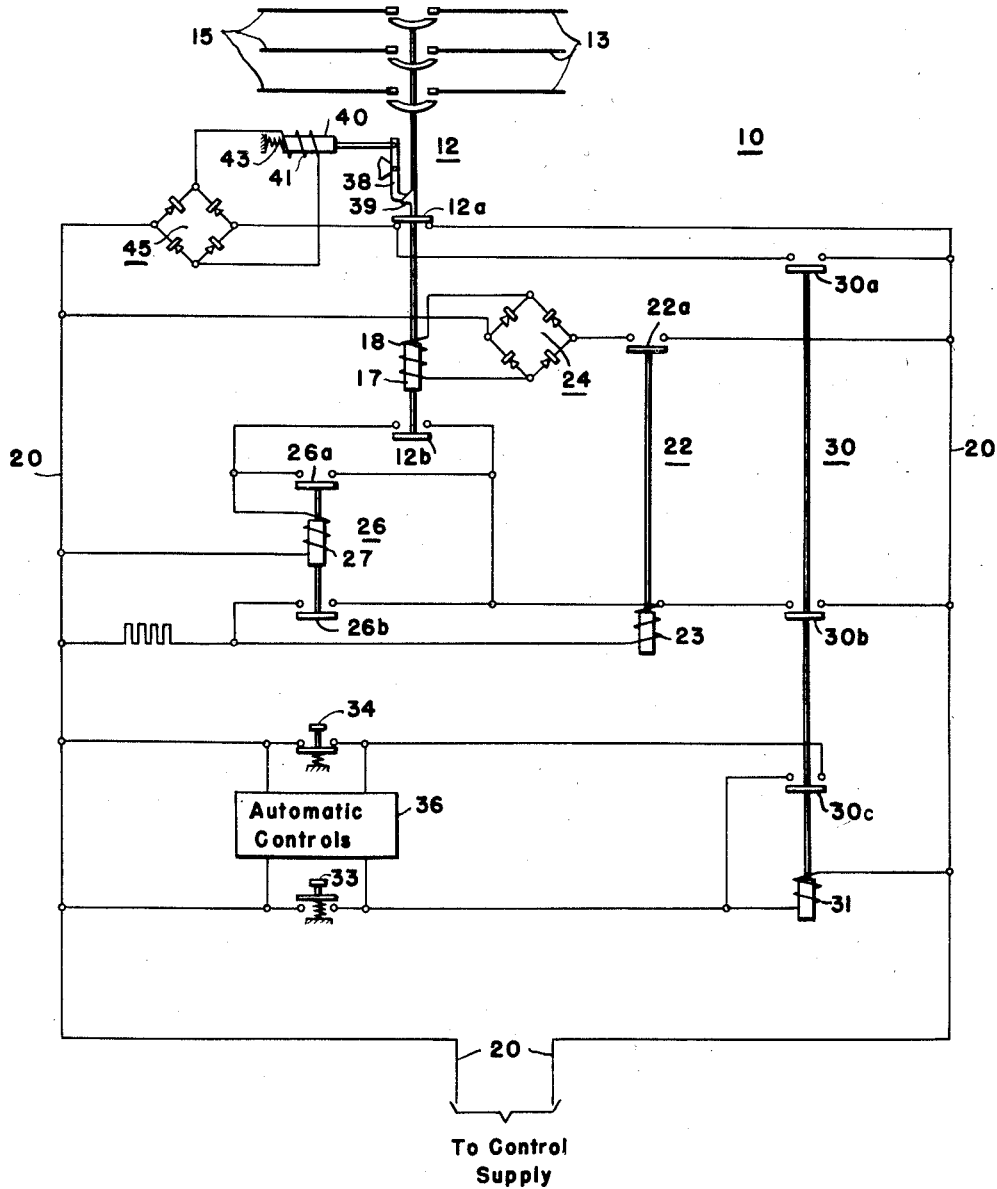
WITNESSES:
INVENTOR
William R. Taliaferro.
BY
ATTORNEY Patented Sept. 25, 1951

2,569,353

UNITED STATES PATENT OFFICE 2,569,353

CONTROL SYSTEM FOR CIRCUIT BREAKERS

William R. Taliaferro, Pittsburgh, Pa., assignor to Westinghouse Electric Corporation, East Pittsburgh, Pa., a corporation of Pennsylvania Application July 22, 1948, Serial No. 40,079

5 Claims. (Cl. 175—294)

My invention relates, generally, to control systems, and it has reference in particular to control systems for circuit breakers.

Generally stated, it is an object of my invention to provide a circuit breaker control system that is simple and inexpensive to manufacture, and is reliable and effective in operation.

More specifically, it is an object of my invention to provide for improving the reliability of circuit breaker control systems which utilize undervoltage trip devices.

Another object of my invention is to provide, in a circuit breaker control system, for re-energizing an undervoltage trip device when the circuit breaker trips, so as to preset the control system for more positively and definitely reclosing the breaker.

Yet another object of my invention is to provide, in a circuit breaker control system, for energizing an undervoltage trip device before the circuit breaker is closed either manually or by automatic reclosing means.

Another important object of my invention is to provide, in a circuit breaker control system, for separately energizing an undervoltage trip device and a circuit breaker closing relay so as to prevent faulty operation of the breaker.

Other objects will in part be obvious, and will in part be explained hereinafter.

In practicing my invention in one of its forms, the undervoltage trip device of a circuit breaker is provided with an energizing circuit through auxiliary contact members of the breaker when it is in the tripped or open position. Separate energizing circuits for the undervoltage trip device and the circuit breaker closing relay are provided through contact members of a master relay, so that the undervoltage trip device is energized so long as the master relay is in the energized position, or the breaker is in the open position.

For a more complete understanding of the nature and scope of my invention, reference may be made to the following detailed description, which may be read in connection with the accompanying drawing, in which the single figure is a diagrammatic view of a circuit breaker control system embodying the invention in one of its forms.

Referring to the drawing, the reference numeral 10 may denote, generally, a control system for a circuit breaker 12 which may be disposed to connect the conductors 13 of a load circuit to corresponding supply conductors 15 which may be connected to a suitable source of alternating current.

The circuit breaker 12 may be of any suitable type comprising, for example, an armature 17 provided with an operating winding 18, which may be energized from a suitable source of control voltage represented by the conductors 20. The conductors 20 may either be connected to a separate source of control voltage, or may derive their electrical energy from the same source to which the supply conductors 15 may be connected.

Energization of the operating winding 18 may be controlled by means of a closing relay 22, having an operating winding 23, operable when closed to connect the winding 18 to the conductors 20 through a rectifier bridge circuit 24 and its contact members 22a. A cutoff relay 26, having an operating winding 27, may be provided for effecting the deenergization of the operating winding 23 of the closing relay 22. An energizing circuit for the operating winding 27 may be provided through normally open contact members 12b of the circuit breaker and contact members 30b of a master control relay 30 having an operating winding 31. Operation of the master control relay may be effected either by means of "close" and "trip" push button switches 33 and 34, or automatic control means of a type well known in the reclosing art, and which may be represented generally by the enclosure 36.

The circuit breaker 12 may be retained in the closed position by means of a latch device 38, which may be disposed to engage a projection 39 on the operating mechanism of the circuit breaker. An armature 40 having an operating winding 41 may be provided for actuating the latch device 38 into engaging relation with the projection 39, against the force of a biasing spring 43, which normally biases the latch device 38 to the "release" position.

In order to insure positive operation of the circuit breaker 12, a separate energizing circuit is provided for the operating winding 41 of the latch device, extending from one of the conductors 20 through a rectifier bridge circuit 45 and contact member 30a of the master relay 30 to the other conductor 20. An additional energizing circuit is provided for the operating winding 41 through a normally closed contact member 12a of the circuit breaker, so that the latch device will be normally energized, both, when the circuit breaker 12 is in the open position, and when the master relay 30 is in the energized position.

In operation, with the circuit breaker in the open position as shown, an energizing circuit will be normally provided for the operating winding 41 through contact members 12a of the circuit breaker from the control conductors 20, which will be normally energized. The latch device 38 will therefore be held in operating position, as shown, ready to engage the projection 39 as soon as the breaker 12 is closed.

When it is desired to close the circuit breaker, the "close" push button switch 33 may be operated to complete an obvious energizing circuit for the operating winding 31 of the master relay 30. A holding circuit is thereupon provided for the operating winding 31 through the "trip" push button switch 34 and contact members 30c. At the same time, an energizing circuit is provided for operating winding 23 of the closing relay 22 through contact members 30b. An energizing circuit for the operating winding 41 of the latch device 38 is also provided at the same time through contact members 30a.

The closing relay 22 operates, and provides an obvious energizing circuit for the operating winding 13 of the circuit breaker 12 through contact members 22a, so that the breaker closes and is immediately latched by the latch device 38 which is in the latch engaging position. Upon closure of the circuit breaker, an energizing circuit is provided for the operating winding 27 of the cutoff relay 26 through contact members 12b of the circuit breaker and contact member 30b of the master relay 30. The cutoff relay operates providing a holding circuit for itself through contact members 26a and providing a shunt about the operating winding 23 of the closing relay through contact members 26b. The closing relay 22 accordingly returns to the deenergized position.

Should the circuit breaker be tripped by operation of the "trip" push button switch 34 or operation of the automatic controls 36, the holding circuit through contact members 30c of the master relay 30 will be interrupted, whereupon the master relay returns to the deenergized position. The energizing circuit for the operating winding 27 of the cutoff relay 26 will thereupon be interrupted at the contact members 30b. At the same time, the energizing circuit for the operating winding 41 of the latch device 38 will be interrupted at the contact members 30a. The spring 43 biases the latch member 38 to the "release" position permitting the circuit breaker 12 to open. Immediately upon opening, an energizing circuit will be provided for the operating winding 41 through contact members 12a of the circuit breaker, thus setting up the latch device 38 for securing the breaker in the closed position immediately upon operation of either the "close" push button switch 33 or the automatic controls 36.

From the above description and the accompanying drawing, it will be apparent that I have provided, in a simple and effective manner, for improving the operation of circuit breaker control systems. Instead of the closing operation of the circuit breaker depending upon the outcome of a race between the buildup of magnetic flux in the undervoltage trip device to a value high enough to hold the breaker in the closed position, and the operation of the breaker closing relay and the breaker closing mechanism, the latching action of the undervoltage relay is made positive and definite.

The latch device will be normally maintained in the latch engaging position while the circuit breaker is open, and will be retained in this position upon operation of the master relay which completes an energizing circuit for the latch device before the existing energizing circuit through the circuit breaker contact members is interrupted.

The reliability of the circuit breaker control system is greatly increased by utilizing the invention, and the amount of testing and adjustment heretofore necessary to adjust the control system for circuit breakers utilizing undervoltage trip devices is substantially eliminated.

While the invention has been illustrated as applied to an alternating current control system utilizing rectifier devices, it will be obvious that a direct current source of control voltage may be used, or that the rectifier devices may be omitted, without departing from the spirit of the invention.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

I claim as my invention:

1. The combination with a circuit breaker, of a closing relay operable to complete a closing circuit for the breaker, an undervoltage trip device operable to maintain the breaker closed, control means operable to complete operating circuits for the closing relay and the undervoltage trip device, and circuit means completing a separate operating circuit for the undervoltage trip device when the breaker is open.

2. In a control system, a circuit breaker, a closing relay operable to complete an energizing circuit for the breaker, an undervoltage relay including latch means operable to latch the breaker in the closed position, a master relay operable to complete energizing circuits for the closing relay and the undervoltage relay, and circuit means connected to complete an additional energizing circuit for the undervoltage relay including contact means normally closed when the breaker is open.

3. A control system for a circuit breaker comprising, a closing relay operable to close the breaker, a latch actuatable to maintain the breaker closed, said latch being normally biased to a release position, voltage responsive control means operable to actuate the latch to a latching position to hold the breaker closed, a master relay operable to complete energizing circuits for the voltage responsive control means and the closing relay, and circuit means completing an energizing circuit for the voltage responsive relay independently of the master relay when the breaker is open.

4. In a control system for a circuit breaker, a latch device normally spring biased to a release position and operable from a source of control voltage to a latching position to hold the breaker closed when the voltage of the source is above a predetermined value, control means operable to complete operating circuits for the breaker and the latch device, and circuit means including normally closed contact members of the circuit breaker operable to complete an additional operating circuit for the latch device when the breaker is open.

5. A control system for a circuit breaker having an operating winding comprising, a closing relay disposed to be energized from a source of control voltage to effect energization of the operating winding to close the breaker, a cutoff relay operable in response to closing of the breaker to effect deenergization of the closing relay, a latch device operable to a latching position in response to energization with greater than a predetermined value of control voltage to secure the breaker in a closed position, a master relay operable to complete separate energizing circuits for the latch device and the closing relay, and circuit means including normally closed contact members of the breaker connected to complete a separate operating circuit for the latch device when the breaker is open.

WILLIAM R. TALIAFERRO.

REFERENCES CITED

The following references are of record in the file of this patent:

UNITED STATES PATENTS

| Number | Name | Date |
|---|---|---|
| 1,564,836 | Dudley | Dec. 8, 1925 |
| 1,632,983 | Procter | June 21, 1927 |
| 1,684,249 | Stevenson | Sept. 11, 1928 |
| 1,715,699 | Ficken | June 4, 1929 |
| 1,811,476 | Peterson | June 23, 1931 |
| 2,106,100 | Jones | Jan. 18, 1938 |